April 17, 1945.   G. B. WATKINS   2,374,057
LAMINATED GLASS STRUCTURE AND METHOD OF PRODUCING THE SAME
Filed June 15, 1942

Inventor
GEORGE B. WATKINS.
By Frank Fraser
Attorney

Patented Apr. 17, 1945

2,374,057

UNITED STATES PATENT OFFICE 2,374,057

LAMINATED GLASS STRUCTURE AND METHOD OF PRODUCING THE SAME

George B. Watkins, Toledo, Ohio, assignor to Libbey-Owens-Ford Glass Company, Toledo, Ohio, a corporation of Ohio Application June 15, 1942, Serial No. 447,058

10 Claims. (Cl. 154—2.71)

The present invention relates to laminated glass structures and to the method of producing the same.

The type of laminated structure to which the invention more particularly relates comprises a laminated safety glass including two sheets of glass and an interposed layer of thermoplastic adherent thereto and in which the plastic interlayer extends beyond the edges of the glass sheets to form an attaching flange. One of the present uses for this type of safety glass is for glazing the windshields and windows of airplanes and other aircraft.

The laminated safety glass structure is mounted in the opening to be glazed by clamping the extended portion only of the plastic interlayer in the supporting frame, with the result that the structure has a certain resiliency or freedom of movement relative to said frame, whereby torsion and shock to which the airplane may be subjected in flight will be "cushioned" and for all practical purposes will not be transmitted directly to the glass, thereby reducing or eliminating the tendency of cracking or shattering thereof from such causes.

In the manufacture of this type of safety glass, it is customary to provide the extended plastic attaching flange with a metal reinforcement, usually in the form of relatively thin, preferably flexible strips of a suitable metal which are embedded in the extended plastic and project inwardly between the glass sheets for a relatively short distance, for example ¼ inch. When the laminated structure is mounted in a supporting frame, by clamping the extended plastic attaching flange therein, those portions of the metal reinforcing strips which project inwardly of the edges of the glass sheets will be exposed to view from both the inside and outside of the plane.

The metal reinforcing strips are preferably formed from aluminum sheeting, and it is well known that ordinary aluminum sheeting has bright, smooth, shiny surfaces possessing a relatively high specular reflection. This specular reflection from the exposed portions of the aluminum reinforcing strips has been found to be objectionable in some installations, and this invention concerns the provision of a laminated structure of the above type in which the specular reflection of the aluminum or other metal reinforcing strips is materially reduced. To this end, the invention contemplates the treatment of the aluminum or other metal reinforcing strips to materially reduce the reflectivity thereof before they are bonded with the glass-plastic laminations.

Other objects and advantages of the invention will become more apparent during the course of the following description, when taken in connection with the accompanying drawing.

In the drawing, wherein like numerals are employed to designate like parts throughout the same:

Figure 1:
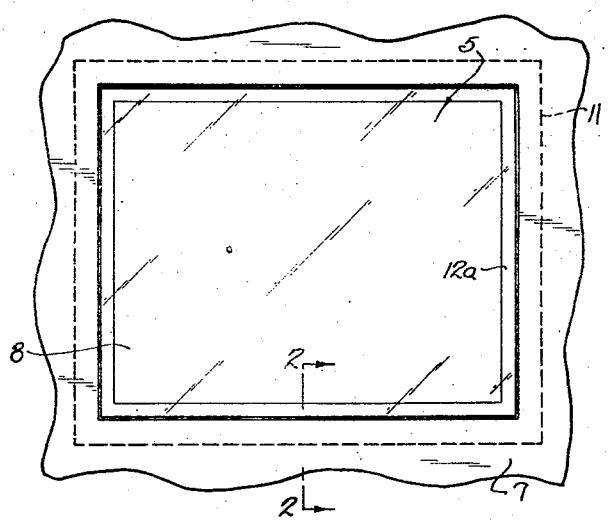
Fig. 1 is a front view of a laminated structure provided by the invention.
Figure 2:
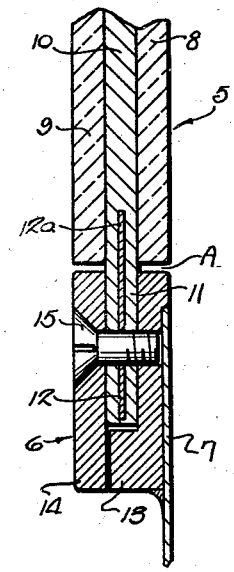
Fig. 2 is a vertical transverse section taken on line 2—2 of Fig. 1.

With reference particularly to Figs. 1 and 2 of the drawing, the laminated structure is designated in its entirety by the numeral 5 and is mounted in a supporting frame 6 carried by the skin or outer wall 7 of the plane. The laminated structure 5 includes the two sheets of glass 8 and 9 and interposed layer of thermoplastic 10 adherent thereto. The glass sheets may be coextensive with one another and are of relatively less surface area than the plastic interlayer so that the plastic extends beyond the edges of the glass sheets to provide a flexible attaching flange 11 secured in the supporting frame 6.

Figure 3:
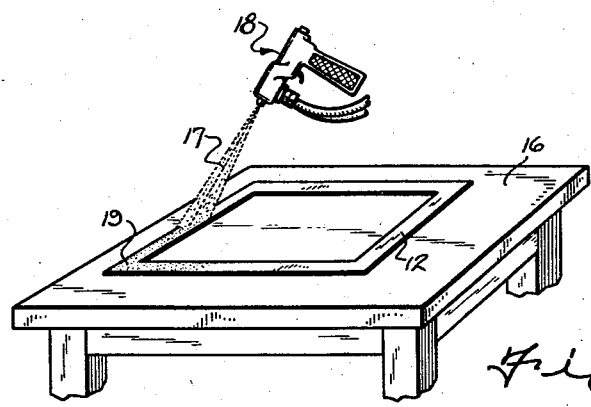
Fig. 3 is a diagrammatic view showing the treatment of the metal reinforcing strips by a sandblasting operation.

The plastic attaching flange 11 is provided with a metal reinforcement 12 in the form of relatively thin, flexible strips of metal, preferably aluminum, which are embedded in the extended plastic and project inwardly a relatively short distance between the glass sheets as indicated at 12a. The metal reinforcement 12 may consist of an individual strip arranged at each edge of the glass sheets and left disconnected at their adjacent ends or the adjacent ends thereof may be welded, soldered or otherwise suitably secured together to form an integral collar. Also, a single one-piece frame may be cut from a sheet of aluminum or other desired metal as shown in Fig. 3. Therefore, the term "metal strips" as used herein and in the claims is to be interpreted as covering not only individual strips disconnected at their adjacent ends but also strips having their adjacent ends secured together as well as a single one-piece frame.

The glass sheets 8 and 9 may consist of ordinary plate or window glass and may be either fully tempered or semi-tempered or any desired combination of glass sheets may be used. Likewise, either one or both of the sheets 8 and 9 may consist of a relatively hard plastic material, such as "Plexiglas" or "Lucite." The plastic interlayer 10 is preferably formed of a synthetic resin material, such as, for example, a polyvinyl acetal resin, although the invention is not limited to the use of any particular resin, class of resins, cellulose derivatives or the like.

Although the supporting frame 6 may be of any suitable construction, it is here shown as comprising outer and inner sections 13 and 14 respectively between which the extended plastic 11 is secured by screws or the like 15. When the laminated structure 5 is mounted in the supporting frame 6, the peripheral edges of the glass sheets 8 and 9 are ordinarily spaced from the frame to leave a small gap or space A therebetween which permits the desired freedom of movement of the laminated structure relative to the frame without binding. With this arrangement, it will be seen that the relatively narrow band of metal 12a projecting inwardly of the edges of the glass sheets will be exposed to view from both the inside and outside of the plane, and it has been found that the specular reflection therefrom is objectionable in some installations, particularly when aluminum is used.

In accordance with the present invention, the specular reflection of the exposed metal is materially reduced by roughening and/or otherwise treating the metal reinforcing strips 12 before they are associated with the glass-plastic laminations and bonded thereto. By way of example, this may be accomplished by subjecting opposite surfaces of the metal strips to a sandblasting operation, as illustrated in Fig. 3, to roughen the said surfaces and reduce the reflectivity thereof. For example, the metal reinforcing strips 12 may be placed horizontally upon a suitable support 16 (Fig. 3) and a sandblast 17 projected thereupon from a suitable type spray gun 18; the sandblasted surface being designated 19.

As illustrative of the invention, it might be mentioned that aluminum reinforcing strips cut from ordinary aluminum sheeting and having a specular reflection of 59% were subjected to a blast of sand of 180 mesh for a few seconds, using 35 pounds air pressure, and that this treatment resulted in the reduction of the specular reflection of the aluminum strips to 5.6%. The specular reflection of the aluminum strips both before and after sandblasting was measured in the same manner by means of a photronic cell. When the aluminum strips are sandblasted in this manner, the bright, smooth, shiny surfaces thereof are given a relatively dull finish somewhat similar to that of a ground glass surface.

It will of course be appreciated that the aluminum or other metal reinforcing strips may also be treated in other ways to reduce the specular reflection thereof, and this invention also comprehends the treatment of the metal strips by other methods, such as, for example, by acid treatment, by grinding or by coloring the surfaces of the metal, etc.

Figure 4:
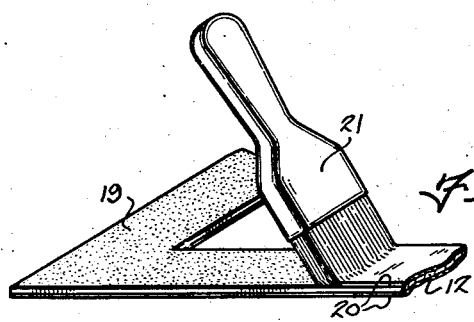
Fig. 4 is a diagrammatic view illustrating the coating of the sandblasted metal strips with a layer of coloring material.

For instance, it has been found that in some cases it may be desirable to apply a layer of coloring material to opposite surfaces of the metal strips 12 to reduce the reflectivity thereof. The coloring material can be applied to the metal strips without the initial step of sandblasting or, if desired, the strips can first be sandblasted and the coloring material then applied thereto as shown in Fig. 4. As here illustrated, layers 20 of a suitable coloring material are applied to opposite surfaces of the sandblasted metal strips 12 by means of a brush 21, although it may be applied thereto by spraying, dipping, etc.

One type of coloring material which has been used consists of a polyvinyl lacquer made up of the following composition:

|  | Per cent |
|---|---|
| Yellow iron oxide | 5.4 |
| Med. chrome yellow (lead chromate) | 2.1 |
| Lamp black | .9 |
| Barytes | 15.6 |
| Talc | 6.0 |
| Plastic vehicle | 60.0 |
| Alcohol | 10.0 |

The plastic vehicle in the above composition contained 15% by weight of polyvinyl butyr acetal resin dissolved in alcohol. This material is of olive drab color and, when used to coat aluminum strips sandblasted in the manner above described, resulted in a further reduction of the specular reflection of the metal to 5.5% when measured by means of a photronic cell.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. A laminated structure comprising two sheets of glass and an interposed layer of thermoplastic adherent thereto which extends beyond the edges of the glass sheets to provide an attaching flange, and a metal reinforcement carried by the extended plastic and projecting inwardly of the edges of the glass sheets, the portion of the metal reinforcement received between the glass sheets being treated to reduce the normal specular reflection of the metal.

2. A laminated structure comprising two sheets of glass and an interposed layer of thermoplastic adherent thereto which extends beyond the edges of the glass sheets to provide an attaching flange, and metal reinforcing strips embedded in the extended plastic and projecting inwardly of the edges of the glass sheets, the opposite surfaces of those portions of the metal strips received between the glass sheets being roughened to reduce the normal specular reflection of the metal.

3. A laminated structure comprising two sheets of glass and an interposed layer of thermoplastic adherent thereto which extends beyond the edges of the glass sheets to provide an attaching flange, and metal reinforcing strips embedded in the extended plastic and projecting inwardly of the edges of the glass sheets, said metal strips having sandblasted surfaces to reduce the normal specular reflection of the metal.

4. A laminated structure comprising two sheets of glass and an interposed layer of thermoplastic adherent thereto which extends beyond the edges of the glass sheets to provide an attaching flange, a metal reinforcement carried by the extended plastic and projecting inwardly of the edges of the glass sheets, and a layer of coloring material applied to the portion of the metal reinforcement received between the glass sheets to reduce the normal specular reflection of the metal.

5. A laminated structure comprising two sheets of glass and an interposed layer of thermoplastic adherent thereto which extends beyond the edges of the glass sheets to provide an attaching flange, metal reinforcing strips embedded in the extended plastic and projecting inwardly of the edges of the glass sheets, the opposite surfaces of those portions of the metal strips received between the glass sheets being roughened, and a layer of coloring material applied to the roughened portions of the metal strips to reduce the normal specular reflection of the metal.

6. In the manufacture of laminated structures of the type including two sheets of glass and an interposed layer of thermoplastic adherent thereto which extends beyond the edges of the glass sheets and carries a metal reinforcement which projects inwardly of the edges of the glass sheets, the method comprising treating the portion of the metal reinforcement to be received between the glass sheets before it is associated with the extended plastic to reduce the normal specular reflection of the metal.

7. In the manufacture of laminated structures of the type including two sheets of glass and an interposed layer of thermoplastic adherent thereto which extends beyond the edges of the glass sheets and has embedded therein metal reinforcing strips which project inwardly of the edges of the glass sheets, the method comprising roughening the opposite surfaces of those portions of the metal strips to be received between the glass sheets before they are assembled with and bonded to the glass-plastic laminations to reduce the normal specular reflection of the metal.

8. In the manufacture of laminated structures of the type including two sheets of glass and an interposed layer of thermoplastic adherent thereto which extends beyond the edges of the glass sheets and has embedded therein metal reinforcing strips which project inwardly of the edges of the glass sheets, the method comprising sandblasting the opposite surfaces of those portions of the metal strips to be received between the glass sheets before they are assembled with and bonded to the glass-plastic laminations to reduce the normal specular reflection of the metal.

9. In the manufacture of laminated structures of the type including two sheets of glass and an interposed layer of thermoplastic adherent thereto which extends beyond the edges of the glass sheets and carries a metal reinforcement which projects inwardly of the edges of the glass sheets, the method comprising applying a coloring material to the portion of the metal reinforcement to be received between the glass sheets before it is associated with the extended plastic to reduce the normal specular reflection of the metal.

10. In the manufacture of laminated structures of the type including two sheets of glass and an interposed layer of thermoplastic adherent thereto which extends beyond the edges of the glass sheets and has embedded therein metal reinforcing strips which project inwardly of the edges of the glass sheets, the method comprising first roughening those portions of the metal reinforcing strips to be received between the glass sheets, and then applying a coloring material to said roughened surfaces before the metal strips are assembled with and bonded to the glass-plastic laminations to reduce the normal specular reflection of the metal.

GEORGE B. WATKINS.